United States Patent
Swinehart

(12) 
(10) Patent No.: US 6,360,951 B1
(45) Date of Patent: Mar. 26, 2002

(54) HAND-HELD SCANNING SYSTEM FOR HEURISTICALLY ORGANIZING SCANNED INFORMATION

(75) Inventor: Daniel Carl Swinehart, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/464,381

(22) Filed: Dec. 16, 1999

(51) Int. Cl.⁷ .................................................. G06K 7/10
(52) U.S. Cl. ......................... 235/472.01; 235/462.07; 235/470; 235/472.03
(58) Field of Search ................................ 235/383, 385, 235/472.01, 472.03, 462.44, 462.28, 462.45, 470, 462.07

(56) References Cited

U.S. PATENT DOCUMENTS

| | | | | |
|---|---|---|---|---|
| 5,237,163 A | * | 8/1993 | Collins, Jr. et al. | 235/472 |
| 5,334,822 A | * | 8/1994 | Sanford | 235/385 |
| 5,414,250 A | * | 5/1995 | Swartz et al. | 235/462 |
| 5,478,989 A | * | 12/1995 | Shepley | 235/375 |
| 5,587,577 A | * | 12/1996 | Schultz | 235/472 |
| 5,640,002 A | * | 6/1997 | Ruppert et al. | 235/472 |
| 5,859,414 A | * | 1/1999 | Grimes et al. | 235/383 |
| 6,234,393 B1 | * | 5/2001 | Paratore et al. | 235/462.46 |

FOREIGN PATENT DOCUMENTS

JP       06012511 A      1/1994      ................. 235/470

OTHER PUBLICATIONS

Advertisement for C Pen, C Technologies AB, month and year missing.

* cited by examiner

Primary Examiner—Karl D. Frech
Assistant Examiner—April A. Nowlin
(74) Attorney, Agent, or Firm—Finnegan, Henderson, Farabow, Garrett & Dunner, L.L.P.

(57) ABSTRACT

Systems consistent with the present invention allow a user to scan document text and then automatically recognize and organize that text into a format for display by the user. The system preferably includes a hand-held device operable by the user for scanning the text of the document. The hand-held device stores the scanned text information and can then transfer the stored text information to a computer. The computer automatically recognizes the scanned text based on the format and context in which the text is found in the document. Further, the computer automatically creates data entries describing the scanned text and organizes these data entries for display to the user.

26 Claims, 3 Drawing Sheets

HAND-HELD SCANNING SYSTEM FOR HEURISTICALLY ORGANIZING SCANNED INFORMATION

BACKGROUND OF THE INVENTION

1. Field of the Invention

The present invention relates to methods and systems for scanning user readable information using a hand-held device and, more particularly, to methods and systems for heuristically organizing the scanned information for later use by a user.

2. Description of the Related Art

Each day, an average person may read a large number of articles from a variety of sources. A routine skim through the daily newspaper may alone account for dozens of articles or advertisements a person may look at in any given day. At work, a person may read even more information found in, for example, trade journals, news periodicals, or even intra-office communications. But during each reading, a person is often at a loss on how to efficiently capture or retain important information.

While reading through this information, people will do one of several things when they read something particularly important to them. First, people may make a note of the important information and where they found it. Additionally, people may tear out or photocopy the article or advertisement and put it in some sort of folder. All too often, however, people will make no record of the information and simply hope that they remember it. But even if a person does use one of the first two options, the information is still not collected and stored in an efficient manner. Records are often poorly kept and cumbersome to search through at a later time.

Recently, hand-held devices have been developed for gathering useful information. These systems typically ask the user for guidance on how to interpret and recognize a document. For example, the system may use a mode book to manually alter a scanning pen's mode. The mode book includes a plurality of mode cards, each of which contains at least one scannable data field operative to change the pen's mode or enter a command. Each scannable data field comprises machine-readable information (e.g., a bar code, a two-dimensional glyph code, or easily-recognizable text) and a human-readable label.

The user uses the mode book as follows. First, the user locates the mode card associated with the type of document the user is currently scanning, and runs the scanning pen over a field associated with the type of information about to be scanned, such as "begin title." In this way, the mode cards inform the scanning pen what type of information it is collecting. Thus, the user alternately scans fields of the mode card to instruct the system on how to process the scanned information.

A problem with these types of systems is that they require a significant amount of intervention on the part of the user. For example, constantly referring to a mode card interrupts the user's normal flow of reading the document. Further, the additional amount of work required by the user actually deters the user from reviewing the document in the first place.

Thus, there is a need for a scanning system that a person can use to store important information found while reading and that operates with minimal intervention on the part of the user. Further, there is a need for such a system that can automatically organize the collected information into a format that a user can efficiently review.

SUMMARY OF THE INVENTION

Systems and methods consistent with the present invention scan user readable information with minimal intervention on the part of the user. Moreover, systems and methods consistent with the invention automatically organize the scanned information into a format that the user may efficiently review, modify, and correct, as needed.

To achieve these and other advantages, a system and method consistent with the present invention scans and formats indicia located on a document. The system includes a scanning head for scanning the indicia located on the document and a memory for storing the scanned indicia. The system further includes a processor for heuristically recognizing a meaning of the scanned indicia stored in the memory. The processor then creates a data entry describing the document and the scanned indica based on the recognized meaning of the scanned indicia.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Embodiments of the present invention will now be described with reference to the accompanying drawings. Whenever possible, the same reference numbers represent the same or similar elements in the different drawings.

System Organization

Figure 1:
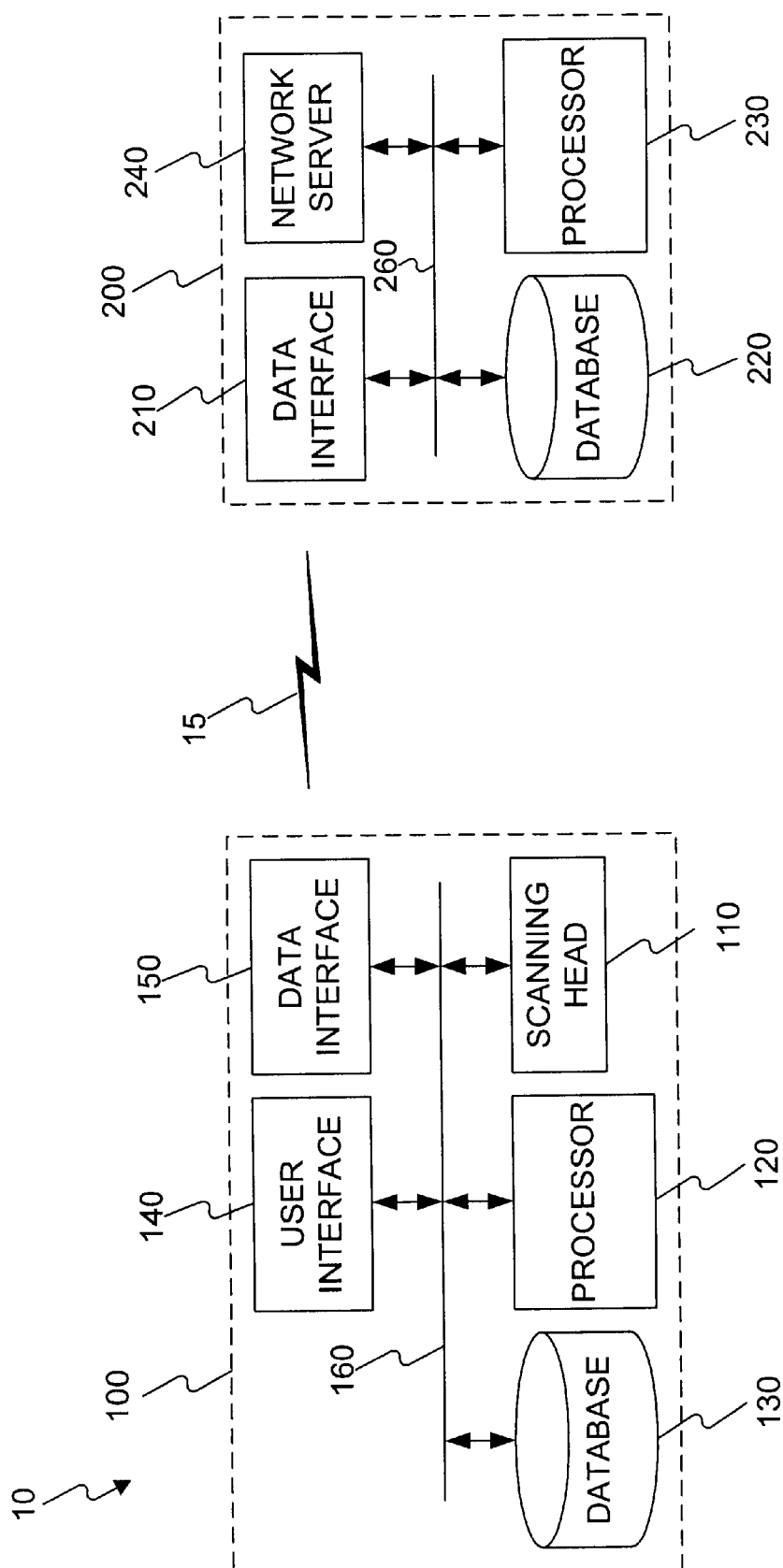
FIG. 1 is a block diagram of a scanning pen system 10 consistent with the present invention.

FIG. 1 is a block diagram of a scanning pen system 10 consistent with the present invention. As shown in FIG. 1, the system includes a scanning pen 100 and a computer 200. Scanning pen 100 communicates with computer 200 over a link 15, which may include, for example, an infrared link, a radio link, or a cable connection. Further, computer 200 may be any computer, such as a personal computer, a network computer, a workstation, or a mainframe computer.

In systems consistent with the invention, a user runs pen 100 across the surface of a document. As the user runs pen 100 across the document, pen 100 scans and collects text information of the document passing under the head of pen 100. Pen 100 preferably performs a character recognition on the scanned text and then transfers this information to computer 200 for processing. In particular, computer 200 heuristically organizes the text information so as to display the scanned information to a user in a desired format.

As shown in FIG. 1, scanning pen includes a scanning head 110, a processor 120, a database 130, a user interface 140, and a data interface 150, each communicating over a bus 160. Although FIG. 1 shows pen 100 as including each of these elements, a pen 100 consistent with the present invention may only include a scanning head that simply transmits in real time the scanned information directly to computer 200. In such a case, computer 200 would perform all of the processing described below as being performed by pen 100.

Scanning head 110 is preferably a single-line scanning device for capturing the text of a document and converting it into a digital form. Scanning head 110 preferably includes an optical character recognition (OCR) device for recognizing text, glyphs, bar codes, or even handwriting. Accordingly, scanning head 110 converts the scanned text into a text file (e.g., an ASCII or HTML file) that preserves text information, such as font type and font size. Alternatively, scanning head 110 may simply convert the scanned text into a bit map file for transfer to computer 200 for character recognition.

Database 130 stores the text information output from scanning head 110. Prior to storing the information, processor 120 preferably time-stamps the text information based on the value of a clock indicating the time the information was scanned by head 110. As described below, the timestamp is used during the recognition process to associate scanned text information with other information scanned in close time proximity to one another. Further, the clock value may indicate either a relative time indicating the time of day or an absolute time that begins with the start of processing of pen 100.

Processor 120 also controls the operation of pen 100 based on control signals received from user interface 140. Although not shown in FIG. 1, user interface 140 preferably comprises a variety of user input/output devices, such as buttons, indicator lights, or a display screen. A user may use a button of interface 140 to assign priority or specific meaning to a particular text scan, as described below. Also, through user interface 140, a user can select a mode of operation of scanning pen 100, including a scan mode, a download mode, or an OFF mode. When in the scan mode, scanning pen 100 collects the text information for storage in database 130. By selecting the download mode, the user causes pen 100 to transfer the contents of database 130 to computer 200 via data interface 150 and link 15. Data interface 150 preferably comprises a bi-directional infrared transceiver or a port allowing a hard-wired connection with computer 200.

As shown in FIG. 1, computer 200 further includes a data interface 210, a database 220, a processor 230, and a network server 240, each communicating over a bus 260. Data interface 210 is similar to data interface 150, and receives the transmitted text information therefrom over link 15. Data interface 210 then stores the received text information in database 220. Computer 200 includes network server 240 for allowing the user to link to a network, such as the Internet, to locate information associated with the scanned text information.

Processor 230 runs software programs (not shown) for heuristically organizing the information stored in database 220. Although pen 100 preferably performs a character recognition routine on the scanned information, processor 230 may perform this operation as well. In either event, processor 230 receives the recognized text information and then heuristically assigns meaning to the recognized characters to form data entries. For example, processor 230 may analyze a string of text and, based on the logic described below, assign that text as corresponding to a title. Further, processor 230 may determine that recognized numerals are page numbers.

Once processor 230 has assigned the text a meaning, the recognized text is grouped together to form a data entry. Each data entry corresponds to particular text within the document that the user has found important. In general, a data entry includes the particular text important to the user and information identifying the document, and the location therein, containing this text.

Figure 2:
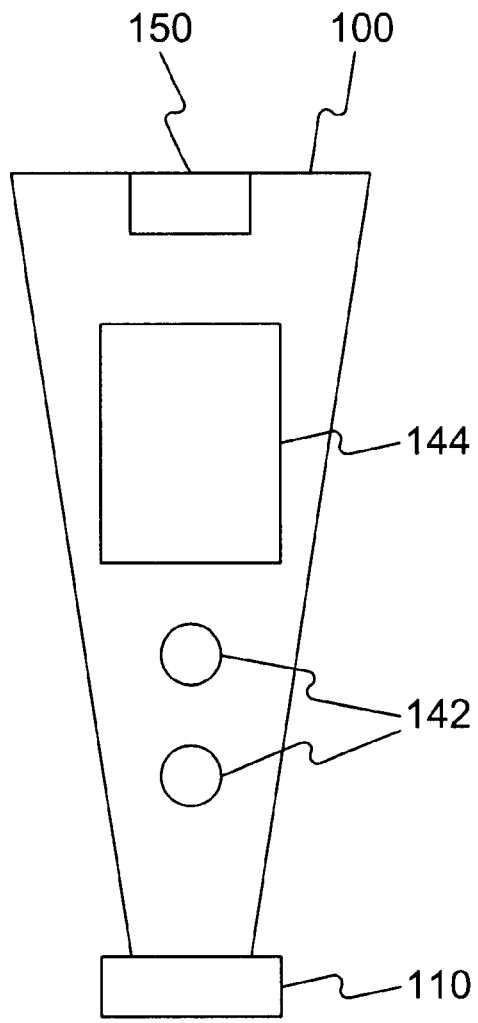
FIG. 2 illustrates an embodiment of scanning pen 100 consistent with the present invention.

FIG. 2 illustrates an embodiment of scanning pen 100 consistent with the present invention. As shown in FIG. 2, scanning pen 100 includes scanning head 110, push buttons 142, a display 144, and data interface 150. Buttons 142 and display 144 correspond to user interface 140 described above with respect to FIG. 1.

In systems consistent with the invention, display screen 144 may confirm to the user the recognized text and the selected mode of operation of pen 100. Further, while FIG. 2 shows a scanning pen 100 having the form of a traditional pen, it may take other forms as well. For example, scanning pen 100 may comprise a separate unit for attachment to a Palm Pilot™. In such a case, scanning pen 100 still performs all the functions and operations described herein, but may, however, share the display of the Palm Pilot™. Pen 100 may also take the form of a smaller device, such as a thimble, which fits over the tip of a user's finger.

System Operation

Figure 3:
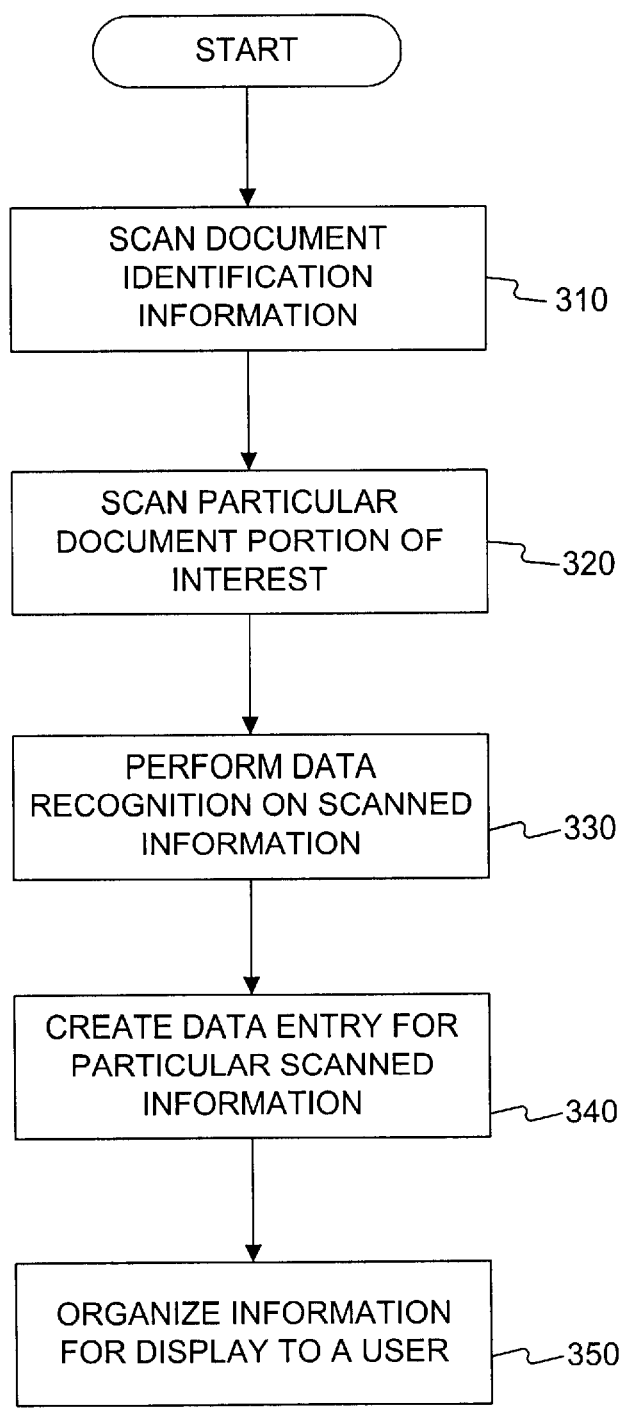
FIG. 3 is a flow diagram illustrating a method consistent with the present invention for operating scanning pen system 10.

FIG. 3 is a flow diagram illustrating a method consistent with the present invention for operating scanning pen system 10. The illustrated method begins once the user presses a button of user interface 140, causing pen 100 to enter the operation mode. After pen 100 has entered the operation mode, the user performs a series of "swipes" with the scanning pen across the surface of the document. Each swipe yields a digital representation of the scanned text.

As shown in FIG. 3, the user first scans information identifying the document (step 310). The identifying information preferably comprises bibliographic data, such as the name of the document, the issue number and date of the document, and even page and section headings of the particular location in the document where the user wishes to scan particular text. Taking the magazine Popular Science, for example, the user may scan the following bibliographic information:

Popular Science

February 1999

Unleashing the Web

By Chris O'Malley

48

The identifying information may also take the form of a bar code located on the document's cover, or even a logo. Either of these can identify the name of the document and possibly other bibliographic information of the document as well. In such a case, computer 200 compares the bar code or logo to product information stored in a database to determine this bibliographic information. Once the user has scanned the above bibliographic information, scanning head 110 performs an OCR routine on the scanned text and stores a digital representation of the text in database 130.

The user then uses pen 100 to scan the particular text of the document that the user finds important and wishes to capture (step 320). For example, the user may find interesting a particular passage in the above Popular Science article or may wish to identify particular "key words" (e.g., Internet, wireless, handheld, browsers) for referencing the article. The user then swipes pen 100 across that part of the text of interest to the user. Scanning head 110 then performs the OCR routine on the scanned text and stores a digital representation of the particular text information in database 130.

As described above with respect to steps 310 and 320, pen 100 preferably stores a digital representation of the scanned text that preserves font types and font sizes. After the user has finished scanning the document, the user transfers the stored information to computer 200 via data interfaces 150 and 210 and link 15. Once transferred, the information is then stored in database 220 of computer 200, which uses the preserved text information during the heuristic recognition processes.

Processor 230 performs the various recognition processes on data stored in database 220 to heuristically create individual data entries (step 330). Each entry includes: (1) the identifying information, such as (a) the name of the document, (b) the date, volume, or issue of the document, (b) the page number at which the user scanned particular textual information; (c) the title or heading of the section containing the particular textual information; and (2) the particular textual information itself. Processor 230 creates a data entry for each particular textual information scanned by the user using pen 100.

In creating each entry, processor 230 capitalizes on the fact that different documents typically follow a common recognizable format and style. For example, page numbers can be recognized as numbers without any surrounding text. Thus, processor 230 automatically creates each entry by heuristically analyzing the font type, font size, surrounding text, and particular textual formats of the scanned text. Based on this analysis, processor 230 determine the text's meaning—i.e, the type of information the scanned text represents.

To this end, processor 230 includes software instructions for performing certain recognition processes. These instructions preferably take the form of rules for identifying certain types of text in a certain context. Using these linguistic rules, processor 230 then analyzes the text to determine its meaning and its placement in the entry. Examples of these linguistic rules are described below:

1. Document Name—Processor 230 recognizes the name of a document upon identifying a logo followed by text. Further, the name of a document is typically printed in larger print and font styles. Thus, processor 230 may also recognize text as corresponding to the document's name based on the font type and font size of that text.

2. Title or Sub-Heading—Processor 230 recognizes a single centered line as a title, such as to an article or to a chapter in a book. Further, processor 230 may recognize a line below the title, and having a smaller print, as the name of an author of that title. Within the body of the document, processor 230 may recognize a separated line of text in bold print as a sub-heading.

3. Page Numbers—Processor 230 recognizes page numbers upon identifying a single number with no nearby surrounding text.

4. Uniform Resource Locators (URLs) and Other Data Formats—Processor 230 recognizes URLs upon identifying a line of text having the format of a URL. Processor 230 may further recognize text scanned closely in time (e.g., within 2–3 seconds) to the URL as a description of information found at that URL. Processor 230 may also recognize other data formats by identifying text having a predefined data format.

The particular text information important to the user is preferably recognized by processor 230 as that text following the identifying information scanned in by the user. Alternatively, processor 230 may recognize the particular text important to the user as text not falling into one of the above linguistic rules. This text, such as "key words" to an article identified by the scanned identifying information, will then be included in the data entry, as described above.

In alternative embodiments of the present invention, computer 200 may be preprogrammed with input templates corresponding to different types of documents, such as a particular magazine. These templates may then guide the recognition processing of computer 200 in identifying the information contained in the document. In particular, these templates may provide information on the expected nature, structure, and content of the documents handled by system 10. In particular, the templates preferably indicate where certain data items are likely to be found within a document, the format of those data items, and other considerations of utility in the above recognition process.

The user may select a template using user interface 140 of pen 100 or an interface on computer 200. Further, system 10 may heuristically determine the appropriate template of the document without further user input. This is particularly possible since different types of documents follow standard formats. For example, magazines and newspapers each have their own recognizable format. Based on the above recognition processes, system 10 could then identify the appropriate template.

In even further embodiments of the invention, a user may use a button of interface 140 to assign priority or specific meaning to a particular text scan. For instance, when scanning the name of a document, the user may push a button to signify that pen 100 is scanning the document's name. This information is then appended to the text information stored in database 130 and used by processor 230 during the recognition process.

After processor 230 has assigned meaning to the recognized text, as described above in step 330, processor 230 then forms the individual data entries (step 340). Processor 230 associates different scanned items with one another based on the time each item was scanned. The time scan of each item is determined from the time-stamp appended to each scan item by processor 120. Accordingly, based on the time-stamp values and the meanings assigned to the text information, processor 230 creates a data entry comprising the identifying information and the particular information important to the user. An example of a data entry appears below:

Popular Science, February 1999, p. 48, "Unleashing the Web," Chris O'Malley. Text: Internet, wireless, handheld, browsers.

Computer 200 then automatically organizes the recognized information for display to the user (step 350). For example, computer 200 may create a chronological journal or bibliographic index of the data entries. In particular, the journal may comprise all of the data entries chronologically organized based on their respective time-stamp values. The bibliographic index may comprise the data entries organized by the name of each document, and sub-organized by particular issues of that document and articles or titles contained within each issue. In either format, a user may then search for desired information based on, for example, the name of the document or key words included in the data entry.

Each entry may also include links to information on a network using network server 240. For example, if processor 230 recognizes a particular URL scanned by a user, then computer 200 may include with the corresponding data entry a link to that URL. Also, computer 200 may provide a link to an on-line location storing a full-text version of the original document. Thus, the user can review the entire document or the relevant article therein in conjunction with reading a particular data entry created by computer 200. Further, the link may be referenced by the recognized description of information found at that URL, described above with respect to the linguistic rule for URLs.

This later feature facilitates the ability to "look behind" the created data entry for additional information, if it proves necessary or desirable to do so. For example, an index may contain only a highlight of the information contained in a document, such as key words for refreshing the user's memory. When this is the case, the user can select the on-line version of the entire document, thereby revealing further information. Furthermore, since the data entry may include a page number, network server 240 of computer 200 may immediately connect the user to the relevant portions of the document's on-line version.

Although system 10 has been described as recording, recognizing, and organizing textual information, system 10 may also process handwriting or speech. To this end, computer 200 may include recognition software well known in the art for recognizing handwriting. Computer 200 could then include the handwritten information scanned by pen 100 with the data entries. Pen 100 could also include a microphone for recording a user's utterances for association with the scanned text in the data entries. Computer 200 could digitize the audio and, if the recording contains speech, recognize the speech by using a speech recognition unit.

Given the automatic processing of document information, it is entirely possible that system 10 failed to correctly identify the text. Accordingly, system 10 allows the user to review the scanned text using computer 200 and make any necessary corrections. As will be appreciated by individuals of ordinary skill in the art, the user can also adjust the recognition process to increase its accuracy. This can be accomplished by several means, including but not limited to, adjusting the above described linguistic rules used to perform the recognition analysis, or by accepting user guidance.

Conclusion

Systems and methods consistent with the present invention scan user-readable information and automatically recognize and organize the scanned information. The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the described implementation includes a scanning pen and a computer, but elements of the scanning system may be implemented in the scanning pen alone or in the computer alone. In addition, although the described system includes hardware and software, elements of the present invention may be implemented as a combination of hardware and software, in software alone, or in hardware alone. Further, the invention may be implemented with both object-oriented and non-object-oriented programming systems.

Although aspects of the present invention are described as being stored in memory, one skilled in the art will appreciate that these aspects can also be stored on other types of computer-readable media, such as secondary storage devices, like hard disks, floppy disks, CD-ROM, an Internet connection, or other forms of RAM or ROM. The scope of the invention is defined by the claims and their equivalents.

What is claimed is:

1. A system for scanning and formatting indicia located on a document comprising:

a scanning head for scanning the indicia located on the document;

a memory for storing the scanned indicia; and a processor for recognizing a meaning of the scanned indicia stored in the memory based on a context in which the scanned indicia appears in the document, and wherein the processor creates a data entry, using the recognized meaning, describing the document and the scanned indicia.

2. The system of claim 1, wherein the scanning head is a single-line scanning unit.

3. The system of claim 1, wherein the scanning head includes an optical character recognition unit.

4. The system of claim 1, wherein the memory stores a bit-mapped image of the indicia, and wherein the processor further includes:

a processor for recognizing the meaning of the scanned indicia based on a format of the indicia.

5. The system of claim 1, wherein the scanning head is located in a hand-held device and wherein the processor is located in a separate computer, and wherein the hand-held device further includes:

a data interface for communicating with the separate computer.

6. The system of claim 5, wherein the data interface comprises a bi-directional infrared transceiver.

7. The system of claim 1, wherein the memory stores a time-stamp value indicating the time the indicia was scanned by the scanning head.

8. The system of claim 1, wherein the processor further, includes:

a first processing unit for automatically recognizing the meaning of the scanned indicia based on a format of the indicia.

9. The system of claim 1, wherein the processor further includes:

a first processing unit for automatically recognizing the meaning of the scanned indicia according to a template identifying a format of indicia located in the document.

10. The system of claim 1, wherein the processor further includes:

a first processing unit for automatically recognizing the meaning of the scanned indicia based on a user input made when the indicia was scanned.

11. The system of claim 1, wherein the processor further includes:

a first processing unit for automatically organizing the recognized indicia into a format for display to a user.

12. The system of claim 1, wherein the data entry further includes:

data identifying the document scanned by the scanning head; and data identifying particular indicia contained in the identified document.

13. The system of claim 12, wherein the data entry further includes:

a link to a version of the document stored on a network.

14. The system of claim 1, wherein the scanning head further includes:

a scanning head that fits over a finger of the user.

15. The system of claim 1, wherein the processor determines the context in which the indicia appears in the document by determining whether the scanned indicia and information adjacent to the scanned indicia satisfy a predetermined textual pattern criteria.

16. The method of claim 1, wherein the recognizing step further includes determining the context in which the indicia appears in the document by determining whether the scanned indicia and information adjacent to the scanned indicia satisfy a predetermined textual pattern criteria.

17. A method for scanning and organizing indicia located on a document comprising the steps of:

scanning the indicia located on the document;

storing the scanned indicia in a memory;

recognizing a meaning of the scanned indicia stored in the memory based on a context in which the scanned indicia appears in the document; and creating a data entry describing the document and the scanned indicia based on the recognized meaning.

18. The method of claim 17, wherein the scanning step further includes:

scanning a single-line of indicia located on the document.

19. The method of claim 17, wherein the scanning step further includes:

recognizing the indicia according to an optical character recognition routine.

20. The method of claim 17, wherein the recognizing step further includes:

recognizing the meaning of the scanned indicia based on a format of the indicia.

21. The method of claim 17, wherein the storing step further includes:

storing a time-stamp value indicating the time the indicia was scanned.

22. The method of claim 17, wherein the recognizing step further includes:

heuristically recognizing the meaning of the scanned indicia according to a template identifying a format of indicia located in the document.

23. The method of claim 17, wherein the recognizing step further includes:

heuristically recognizing the meaning of the scanned indicia based on a user input made when the indicia was scanned.

24. The method of claim 17, wherein the recognizing step further includes:

organizing the recognized indicia into a format for display to a user.

25. The method of claim 17, wherein the step of creating a data entry further includes:

creating a data entry including data identifying the document scanned by the scanning head and including data identifying particular indicia contained in the identified document.

26. The method of claim 25, wherein the step of creating a data entry further includes:

creating a link to a version of the document stored on a network.

* * * * *